United States Patent
Obilisetty

(10) Patent No.: US 7,577,904 B1
(45) Date of Patent: Aug. 18, 2009

(54) DEFINITION AND DISTRIBUTION OF BUSINESS RULES WHILE ENFORCING SYNTACTIC AND SEMANTIC VALIDATION

(75) Inventor: Sridhar Obilisetty, Milpitas, CA (US)

(73) Assignee: Vianeta Communication, Milpitas, CA (US)

(*) Notice: Subject to any disclaimer, the term of this patent is extended or adjusted under 35 U.S.C. 154(b) by 221 days.

(21) Appl. No.: 10/113,011

(22) Filed: Mar. 28, 2002

Related U.S. Application Data

(60) Provisional application No. 60/279,853, filed on Mar. 28, 2001.

(51) Int. Cl.
*G06N 3/00* (2006.01)

(52) U.S. Cl. .................................. 715/234

(58) Field of Classification Search ............ 715/513, 715/708, 500, 517, 523, 530, 205, 234, 235, 715/236, 237, 255; 709/223, 204; 340/5.52
See application file for complete search history.

(56) References Cited

U.S. PATENT DOCUMENTS

| | | | | |
|---|---|---|---|---|
| 5,534,855 A | * | 7/1996 | Shockley et al. | 340/5.52 |
| 6,373,502 B1 | * | 4/2002 | Nielsen | 715/708 |
| 6,438,580 B1 | * | 8/2002 | Mears et al. | 709/204 |
| 6,651,097 B1 | * | 11/2003 | Maruyama et al. | 709/223 |
| 2002/0107889 A1 | * | 8/2002 | Stone et al. | 707/513 |

OTHER PUBLICATIONS

Peek et al. Learning the Unix Operating System: 4th Edition, Dec. 1997, O'Reilly, Chapter 3.*

* cited by examiner

*Primary Examiner*—Stephen S Hong
*Assistant Examiner*—Kyle R Stork
(74) *Attorney, Agent, or Firm*—Townsend and Townsend and Crew LLP

(57) ABSTRACT

A method and system that provides for the definition and distribution of business rules is disclosed. The method provides for receiving login information that is used to initiate an authentication process, making an authentication based on the received login information, receiving server communicated XML (Extensible Markup Language) business rules and DTD (document type definition), modifying a business rule based on input from the authenticated source, and the validating of the modified business rule. Moreover, the method and system of the present invention provides for the sending of a new XML business rule to a server. The new business rule is created as a declarative object instead of a programming object.

32 Claims, 6 Drawing Sheets

DEFINITION AND DISTRIBUTION OF BUSINESS RULES WHILE ENFORCING SYNTACTIC AND SEMANTIC VALIDATION

RELATED U.S. APPLICATION

This application claims priority to the copending provisional patent application Ser. No. 60/279,853, entitled "Definition and Distribution of Business Rules While Enforcing Syntactic and Semantic Validation," with filing date Mar. 28, 2001, and assigned to the assignee of the present invention.

TECHNICAL FIELD

The present invention relates generally to computer system networks. In particular, the present invention relates to a method and system for the definition and distribution of business rules in a computer system network.

BACKGROUND ART

Over the last few years, the Internet has been transformed from a place where Web enthusiasts perform information searches, Net surfing, and light "e-commerce" to a full-fledged, essential enterprise tool to conduct business. Nowadays, many enterprises do not limit themselves to providing a Web site that serves to merely publish information about their products, partners, management and market messages. Indeed, these enterprises more fully utilize the Web in managing their entire supply chain via B2B (business-to-business) marketplaces, and in generating substantial amounts of revenue from e-commerce. Companies have also Web-enabled business operations such as Human Resources, and have introduced "e-learning" programs to educate customers and resellers.

Web-enabling a business operation involves creating software that maps a business process into corresponding logical steps, with the resultant business logic being implemented in software. In the first generation of solutions, this was accomplished by hard-coding the business logic into server software. These solutions require the careful mapping of a business process (such as the steps involved in an e-commerce transaction) into the programming constructs of the server's scripts—which is a non-trivial task. Later, to change a business rule, business managers have to depend on software developers and programmers to figure out how to modify a working program to accommodate the changes. This is time-consuming and error prone, and takes control away from business managers.

The second generation of solutions put control back into the hands of business managers. These solutions provided business managers with Visual Tools (essentially code generators) for driving business logic. With the support of these Visual Tools, business managers were no longer dependent on software developers for the most part. Business rules were separated from the rest of the server software and were represented in proprietary storage formats like reverse polish notation, which are designed for machine, and not human, consumption. These solutions became popularly used in processes for e-commerce and for personalization of content display.

However, Visual Tools are limited in their ability to accommodate complex business processes (such as those involved in back offices of large business enterprises). This is because the range of business rule modifications that a business manager can perform using code generators is restricted by the functionality built into the underlying program and the program's user interface. In addition, it would be impractical to attempt to design a generic code generator that could accommodate every business rule and all possible modifications for any enterprise. Such a program would be enormously large and complex, and would not be cost-effective.

It should be appreciated that both first and second-generation solutions are server-based and render clients fully dependent on an uninterrupted connection to the server. Since most mission-critical business operations are mapped onto a client/server architecture, reliance on the non-stop availability of a high bandwidth network connection can be a negative factor preventing migration of business critical applications onto the Web.

SUMMARY OF THE INVENTION

Accordingly, a need exists for a method and system that provide for the definition and distribution of business rules where reliance on an uninterrupted connection to a server is not necessary. The present invention provides a method and system that accomplish this need.

For instance, one embodiment of the present invention provides a method and system that provides for receiving login information that is used to initiate an authentication process, making an authentication based on the received login information, receiving server communicated XML (Extensible Markup Language) business rules and DTD (document type definition), modifying a business rule based on input from the authenticated source, and validating the modified business rule. Moreover, the method and system of the present invention provides for the sending of a new XML business rule to a server. The new business rule is created as a declarative object instead of a programming object.

According to one embodiment of the present invention, a business rule defined in an XML file is validated locally using DTD files. In one such embodiment, changing the business rule changes the business logic.

In another embodiment, a user authentication is made based on received login information. The user's privileges are determined from the authentication process.

In yet another embodiment, a rule consists of a tag, an optional condition set, and an action set. In such an embodiment, a condition set defines conditions that make a rule true, and an action set defines actions that are performed if all the conditions in the condition set are true. According to such an embodiment, a rule is automatically true if it has no condition set. Moreover, according to such an embodiment, an action set is performed if all conditions are true but ignored otherwise.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate an embodiment of the invention and, together with the description, serve to explain the principles of the invention.

DETAILED DESCRIPTION OF THE INVENTION

Figure 1:
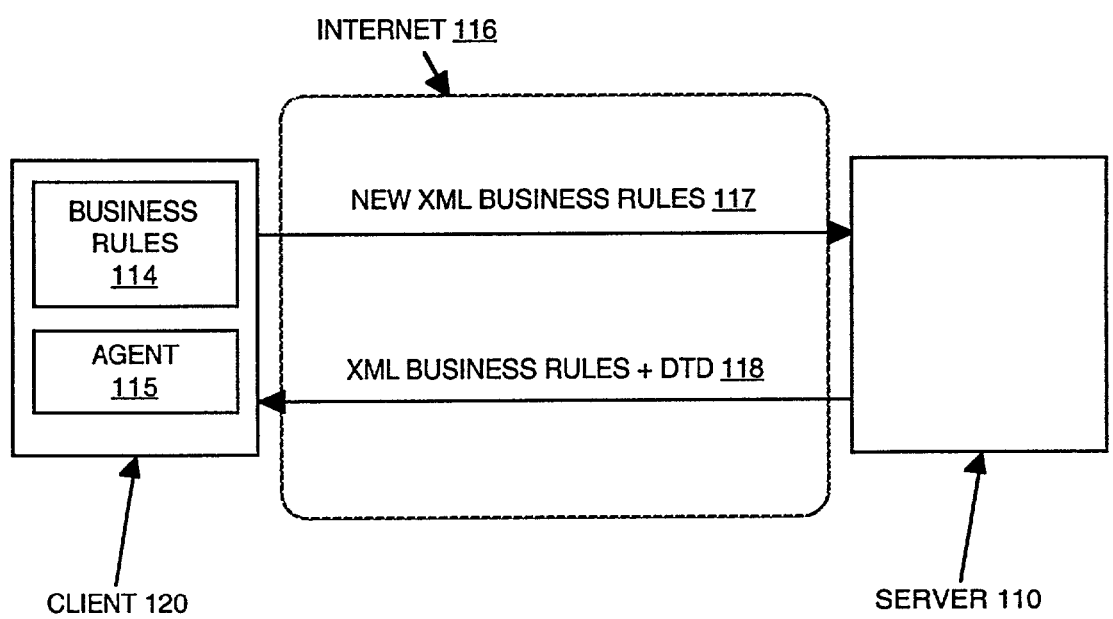
FIG. 1 is a block diagram illustrating a system for distributing XML (Extensible Markup Language) based business rules in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer system or electronic computing device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "validating" or "authenticating" or "providing" or "modifying" or the like, refer to the action and processes of a computer system, or similar electronic computing device, that manipulates and transforms data. For example, the data is represented as physical (electronic) quantities within the computer system's registers and memories and is transformed into other data similarly represented as physical quantities within the computer system memories or registers or other such information storage, transmission, or display devices.

The method and system of the present invention provides for the defining and distributing of business rules based on XML (Extensible Markup Language). In accordance with the present invention, virtually any complex business process can be mapped into a set of human-understandable XML business rules. Business rules are created as declarative objects instead of programming objects according to this embodiment. Exemplary embodiments of the present invention provide: data content definition; specification of the structural relationships that exist inside the data; DTD (document type definition) schema to guarantee the validity of an XML document; and a human-readable and readily modifiable format. According to exemplary embodiments, creating the XML documents is well within the reach of non-technical professionals, particularly with the emergence of visual tools that specialize in producing these documents.

The Business Rules Engine of the present invention enables a user to set valid business rules and use the results to drive the business logic layer of a Web-based application from the server or client side. For example, in accordance with one embodiment of the present invention, an automobile manufacturer may develop a Web-based client/server application for each of their dealerships. It should be appreciated that each of the applications may have a set of default business rules. It should be further appreciated that these rules may be cached and changed locally. Moreover, because no two dealerships are alike as far as pricing, promotions, etc., are concerned, according to exemplary embodiments it is possible for dealerships (clients) to customize their business rules. The customized business rules may then be validated locally. Because business rules may be cached, customized and validated locally, according to exemplary embodiments, dealerships would not have to rely on always being connected to a server.

The present invention thus provides an XML based Business Rule Engine that provides a quantum leap in the configurability of a system. Embodiments of the present invention provide for the first time a usable framework for mapping complex business processes onto a Web-enabled mission-critical business application.

Other advantages provided by embodiments of the present invention include the capacity to customize business rules either on a client or on a server. According to exemplary embodiments, the capacity to use standard tools like DTD schema to validate the XML files on a client or on a server is also provided for. In addition, accurate mapping of business processes is provided for—complex business processes (such as those involved in the back-offices of large enterprises) can be accurately mapped onto machine and human readable XML format. It should be appreciated that, according to exemplary embodiments of the present invention, improved scalability is provided for—business rules can be contained in one XML file and shipped to a client using a single network connection. Also, exemplary embodiments of the present invention feature a separation of program application presentation logic from its business logic. This feature is a key attribute of effective application design. Moreover, platform and language independence is provided for in exemplary embodiments—the business logic stored in the XML file can be executed in any language and on any platform.

Exemplary Network in Accordance with Embodiments of the Present Invention

FIG. 1 is a block diagram illustrating a system 100 for distributing XML (Extensible Markup Language) based business rules in accordance with one embodiment of the present invention. Referring to FIG. 1 there is shown, client 120, business rules 114, agent 115, Internet 116, new XML business rules 117, XML business rules+DTD (document type definition) 118, and server 110.

In accordance with one embodiment of the present invention, business rules 114 govern the execution of the business logic controlling business processes supported by a computer system network. Virtually any complex business process can be mapped into a set of human understandable XML business rules 114. According to one embodiment of the present invention, a user is able to set valid business rules 114 and to use the results to drive the business logic layer of a Web-based application from either the server 110 or the client 120. For example, a system user may modify business rules that control his printing operations by changing the rules that direct when, where and how his print jobs are to be carried out. In accordance with one embodiment of the present invention, the modified rules are created as declarative objects instead of programming objects. This is because the printing functionality may be "declared" in the DTD files that validate the modified rules. According to one embodiment, these files are constructed in a top down or hierarchical manner (e.g., functionality declared in DTD file for a node is printing; printing destination declared in DTD file to be "printer 3, tray 1," etc.). According to one embodiment, rules that are defined in the DTD files can be validated. Once the user logs out, the latest version of his XML "rule file" (e.g., new XML business rules 117) is stored on the server 110. According to exemplary embodiments, this process is carried out for each system user.

Residing on the client 120 is agent 115. According to one embodiment, agent 115 is a software program or set of computer-readable program instructions that facilitates implementation of the present invention. Agent 115 is described further in the co-pending US Patent Application entitled "Centrally Managed and Distributed Applications," Ser. No. 09/803,514, filed Mar. 8, 2001, assigned to the assignee of the present invention and hereby incorporated by reference.

Keeping the latest rules on a server 110 enables the user to log in from any client 120 and run an application according to his or her business rules without being forced to reenter them every time he or she logs in. According to one embodiment, a date/time stamp is used to synchronize the server 110 and client 120 rule files. It should be appreciated that, once a system user logs in to the client 120 portion of a Web based (e.g., Internet 116) client/server business application, the current set of business rules for the user, in the form of XML and DTD files (e.g. XML rules+DTD 118), is sent from the server 110 to the client 120. If the client 120 version of the file is modified during a session, that version (e.g., new business rules 117) is uploaded and stored at the server 110.

Exemplary Operations in Accordance with Embodiments of the Present Invention

Figure 2:
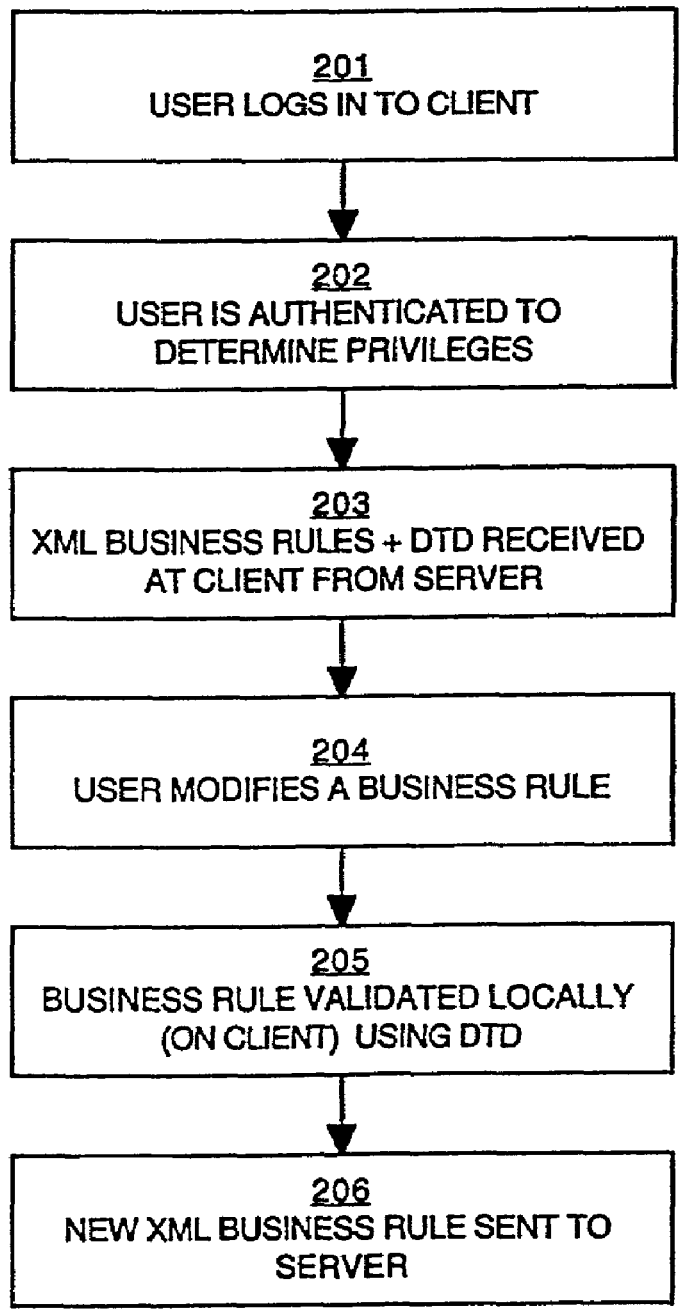
FIG. 2 is a flowchart of the steps in a process for distributing XML (Extensible Markup Language) based business rules in accordance with one embodiment of the present invention.

FIG. 2 is a flowchart 200 of steps executed in a process for distributing XML based business rules in accordance with one embodiment of the present invention. Flowchart 200 includes processes of the present invention which, in one embodiment, are carried out by processors and electrical components under the control of computer readable and computer executable instructions. The computer readable and computer executable instructions reside, for example, in data storage features such as computer usable volatile memory and/or computer usable non-volatile memory (e.g., 604 and 606 described herein with reference to FIG. 6). However, the computer readable and computer executable instructions may reside in any type of computer readable medium. Although specific steps are disclosed in flowchart 200, such steps are exemplary. That is, the present invention is well suited to performing various other steps or variations of the steps recited in FIG. 2. Within the present embodiment, it should be appreciated that the steps of flowchart 200 may be performed by software, by hardware or by a combination of both.

At step 201, the user logs into the client portion of a Web-based client/server business application (e.g., client 120 of FIG. 1) and is identified to determine the privileges that he/she has with respect to their system enabled capacity to change existing business rules (e.g., business rules 114 of FIG. 1) at step 202.

At step 203, the current set of business rules for the user, in the form of XML and DTD files, is sent from the server 110 to the client 120. Initially, a default rule set is used.

At step 204, if the user modifies a business rule, two operations may proceed therefrom (see steps 205 and 206). At step 205, using the DTD file, the rule gets immediately validated (e.g., locally) for syntactical and semantical integrity. According to one embodiment, a semantical invalidation of a rule may occur when a user submits a rule that is not defined in DTD (see step 201). While a syntactical invalidation of a rule may occur when an improper sequence of data related to the rule is submitted by the user.

At step 206, according to one embodiment, the modified XML file may be first stored locally at the client 120 and then uploaded to the server 110 at the end of the log-in session. This process operates to minimize network traffic (for example, if the same rule is changed more than once). It also minimizes system dependency on an uninterrupted network connection for the provision of server-based business rules.

Figure 3:
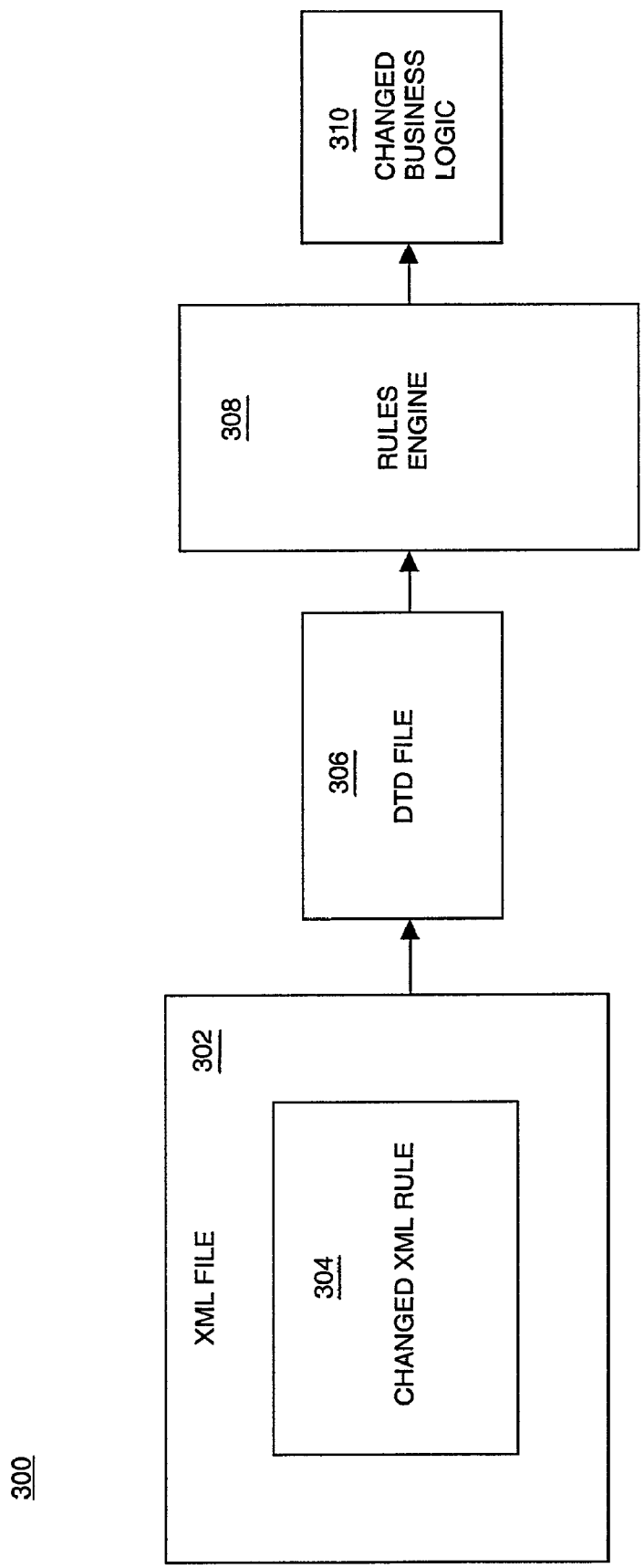
FIG. 3 is a functional block diagram illustrating the function of a rules engine in accordance with one embodiment of the present invention.

FIG. 3 is a functional block diagram 300 illustrating the function of the rules engine and associated system components. This figure illustrates essential system processes and links between each of the processes and relevant data structures. Referring to FIG. 3 there is shown rules engine 308, XML file 302, changed XML rule 304, DTD files 306, and changed business logic 310.

Referring again to FIG. 3, rules 304 are defined in an XML file 302 and are processed by the rules engine 308. It should be appreciated that, according to one embodiment, rules engine 308 enables a user to set valid business rules (e.g., 304) and use the results to drive the business logic layer of a web based application from the server or client side. By changing a rule in the XML file 302, a business manager is empowered to change an application's business logic 310 without the need to ever touch the underlying code. To make sure that a syntactically and semantically valid XML is submitted to the engine, there are a number of DTD files (e.g., 306) that provide validation (see discussion regarding semantic and syntactic validation made herein with reference to FIG. 2, step 206). It should be appreciated that the DTD files are constructed in a top-down manner, starting with for example, a file for an industry for which the application was developed and finishing with a file created specifically for a particular enterprise.

Figure 4:
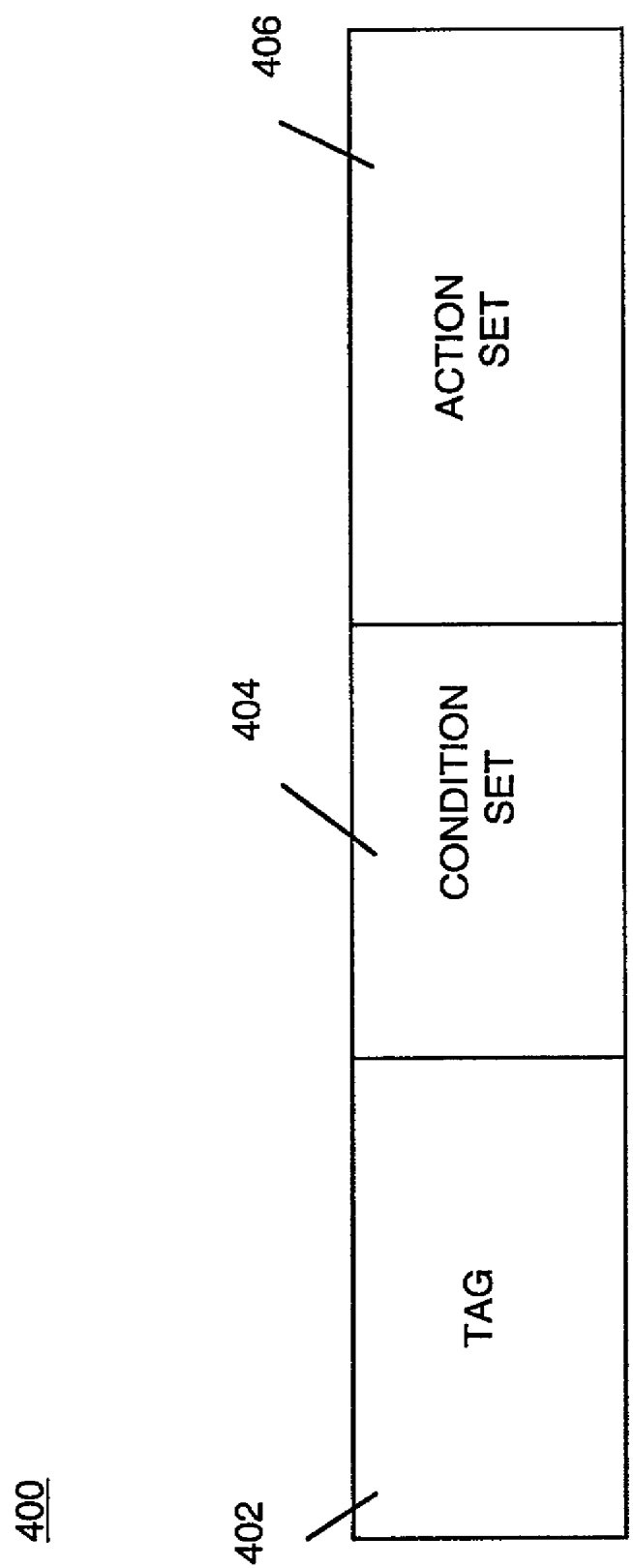
FIG. 4 shows a chart representing a structure of a rule set in accordance with one embodiment of the present invention.

Exemplary Rule Structure and Attendant Operations in Accordance with Embodiments of the Present Invention FIG. 4 shows the structure of a rule set 400 in accordance with one embodiment of the present invention. Referring to FIG. 4 there is shown tag 402, condition set 404, and action set 406. Rules (e.g., 114 in FIG. 1) are defined in rule sets (e.g., 400). A rule set is a collection of one or more rules. A rule set is defined in an XML file (e.g., 302). An XML file may contain only one rule set. For example, according to one embodiment, all application printing related rules may be defined in a_PrintRuleFile.xml.

Referring again to FIG. 4, as mentioned above, a rule (e.g., 114) consists of the <rule> tag 402, an optional "condition set" 404, and an "action set" 406. A condition set 404 defines the conditions that make a rule true. The action set 406 defines actions that the rule performs if all the conditions in the condition set are true. According to one embodiment, if a rule does not have a condition set, it is automatically true.

In accordance with one embodiment of the present invention, a condition uses comparators to compare two operands. The operands may be basic types (e.g., text, number, Boolean, etc.) or commands. Further, in accordance with one embodiment of the present invention, a condition expression uses comparators to evaluate the two operands. The comparator describes how to compare the two operands. Comparators are similar to Boolean operators in that expressions evaluate to true or false. There are several types of comparators (e.g., less-than, greater-than, equals, etc.).

In addition to conditions, rule sets also include actions. Actions define procedures that can be used as executable logic for conditions. Conditions and actions, according to one embodiment of the present invention, are further described below.

Conditions

As mentioned previously, most rule sets (e.g., 400) contain one or more condition sets (e.g., 404). According to one embodiment of the present invention, a condition set (e.g., 404) defines the conditions that must be met in order for a rule to be true. A rule that does not have a condition set (e.g., 404) is automatically deemed true.

Condition sets (e.g., 404), defined with the <condition-set> tag, include one or more conditions. A condition, defined with the <condition> tag, is an expression that evaluates to true or false. If all the conditions in a condition set (e.g., 404) are true, the actions defined in the rule's action set (e.g., 406) are performed; otherwise, the actions are ignored.

If a condition set (e.g., 404) has more than one condition, the <condition-set> tag's grouping attribute is used to group them logically. According to one embodiment of the present invention, a condition set (e.g., 404) can also be nested within another set using the grouping attribute. Sets can be nested to any level. For example:

<condition-set grouping="and">
      <condition 1>
      <!--condition definition-->
      <condition 2>
      <!--condition definition>-->
    </condition-set>

In this example, the condition set's grouping attribute is set to "and", meaning that both the first condition and the second condition must be true in order for the rule to be true.

As mentioned previously, a condition compares two items, or operands. The compared items can be constants of number, text, or Boolean types, or a value returned by a method. According to one embodiment of the present invention, several methods are built into the Rules Engine (e.g., 308) and are available for any rule set (e.g., 400) that is defined. In exemplary embodiments, method invocation may also be created using the <action> tag.

Actions

In accordance with exemplary embodiments of the present invention, actions are executable objects that are surrounded in a rule by the <action> and </action> tags. The object is identified by a URL (Uniform Resource Locator) and can be of two types: (1) a URL; or (2) a local executable file. For example:

<action> http://www.vianeta.com/objects/doaction.asp
    </action>
    or
    <action> file:///local object.do local action(param)<
    </action>

In accordance with one embodiment of the present invention, the combination of XML and DTD files creates the business logic in text rather than in code, and consequently enables ready modification and standard validation.

Figure 5:
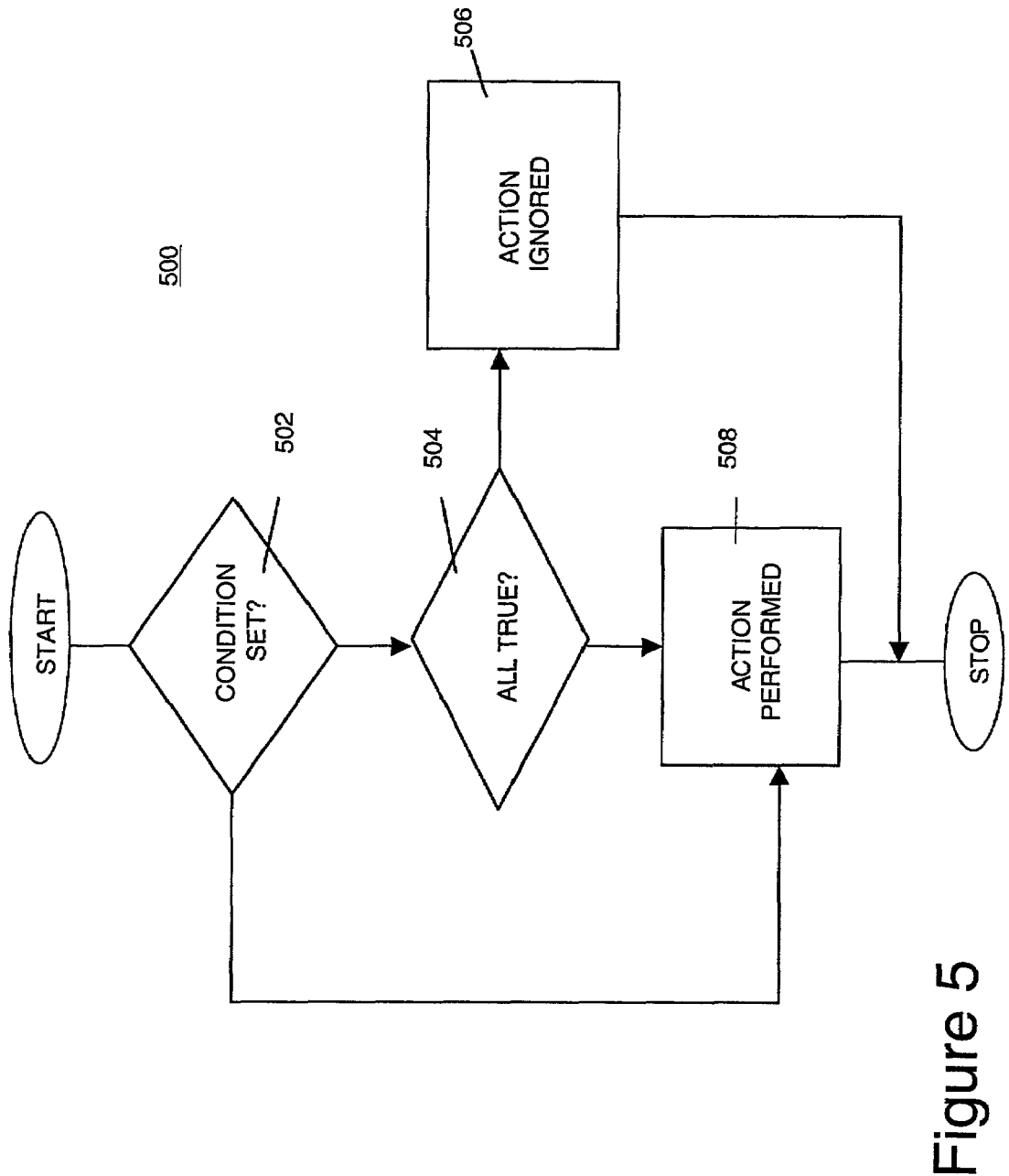
FIG. 5 shows a flowchart that illustrates the interrelationship of rule set components according to one embodiment of the present invention.

FIG. 5 shows a flowchart 500 that illustrates the interrelationship of rule set components in the determination of actions to be performed according to one embodiment of the present invention.

At step 502, the absence or presence of a condition set for a rule is detected. The absence of a condition set triggers the execution of an action to be performed. If it is determined that a condition set is present, then it must be determined whether or not all the conditions found in the condition set are true. According to one embodiment of the present invention, if a rule has no condition set it is automatically true.

At step 504, if a rule condition set is detected, it is determined whether or not the conditions defined by the condition set have been met. If all of the conditions defined by the condition set are determined to be met, then the corresponding rule is determined to be true.

At step 508, if all the conditions in a condition set are met the actions defined in the rules corresponding action set are performed. These actions define procedures that can be used as executable logic for conditions. If all the conditions in a condition set are not met the actions defined in the rules action set are ignored as is shown at step 506.

Exemplary Hardware in Accordance with Embodiments of the Present Invention

Figure 6:
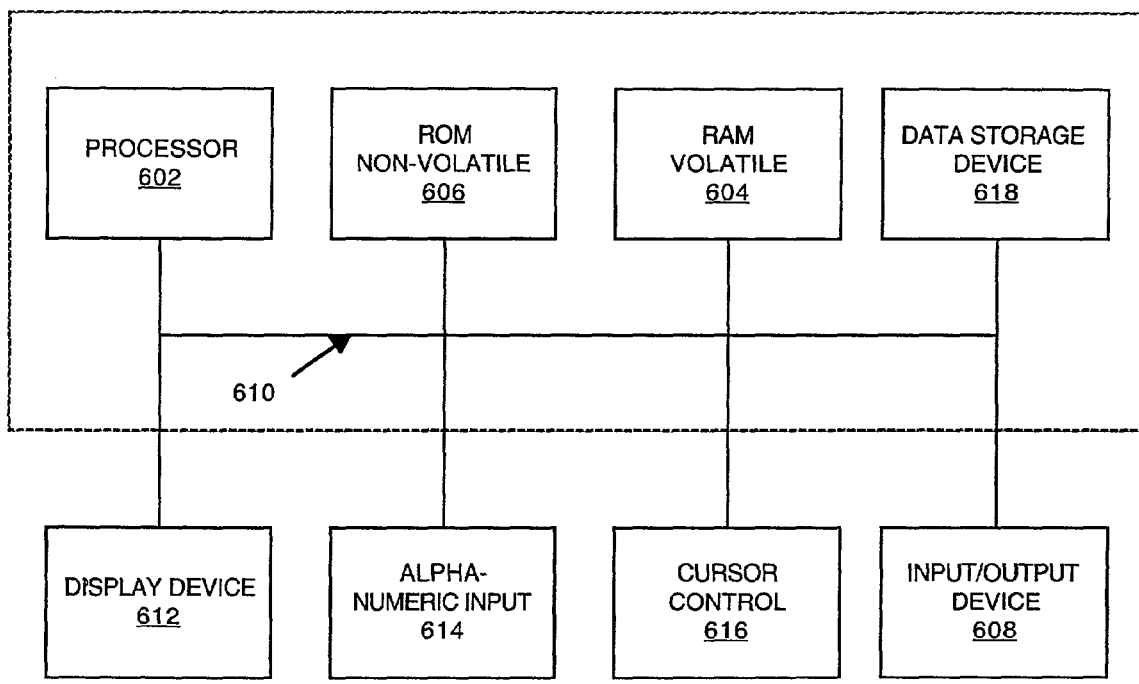
FIG. 6 is a block diagram of an embodiment of an exemplary computer system used in accordance with one embodiment of the present invention.

FIG. 6 is a block diagram of an embodiment of an exemplary computer system 600 used in accordance with the present invention. It should be appreciated that system 600 is not strictly limited to be a computer system. As such, system 600 of the present embodiment is well suited to be any type of computing device (e.g., server computer, portable computing device, etc.). Within the following discussions of the present invention, certain processes and steps are discussed that are realized, in one embodiment, as a series of instructions (e.g., software program) that reside within computer readable memory units of computer system 600 and executed by a processor(s) of system 600. When executed, the instructions cause computer 600 to perform specific actions and exhibit specific behavior that is described in detail below.

Computer system 600 of FIG. 6 comprises an address/data bus 610 for communicating information, one or more central processors 602 coupled with bus 610 for processing information and instructions. Central processor unit 602 may be a microprocessor or any other type of processor. The computer 600 also includes data storage features such as a computer usable volatile memory unit 604 (e.g., random access memory, static RAM, dynamic RAM, etc.) coupled with bus 610 for storing information and instructions for central processor(s) 602, a computer usable non-volatile memory unit 606 (e.g., read only memory, programmable ROM, flash memory, EPROM, EEPROM, etc.) coupled with bus 610 for storing static information and instructions for processor(s) 602. System 600 also includes one or more signal generating and receiving devices 608 coupled with bus 610 for enabling system 600 to interface with other electronic devices. The communication interface(s) 608 of the present embodiment may include wired and/or wireless communication technology. For example, in one embodiment of the present invention, the communication interface 608 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

Optionally, computer system 600 can include an alphanumeric input device 614 including alphanumeric and function keys coupled to the bus 610 for communicating information and command selections to the central processor(s) 602. The computer 600 can include an optional cursor control or cursor directing device 616 coupled to the bus 610 for communicating user input information and command selections to the central processor(s) 602. The cursor directing device 616 can be implemented using a number of well known device such as a mouse, a track ball, a track pad, an optical tracking device, a touch screen, etc. Alternatively, it is appreciated that a cursor can be directed and/or activated via input from alphanumeric input device 614 using special keys and key sequence commands. The present embodiment is also well suited to directing a cursor by other means such as, for example, voice commands. The system 600 can also includes a computer usable mass data storage device 618 such as a magnetic or optical disk and disk drive (e.g., hard drive or floppy diskette) coupled with bus 610 for storing information and instructions. An optional display device 612 is coupled to bus 610 of system 600 for displaying video and/or graphics. It should be appreciated that optional display device 612 may be a cathode ray tube (CRT), flat panel liquid crystal display (LCD), field emission display (FED), plasma display, or any other display device suitable for displaying video and/or graphic images and alphanumeric characters recognizable to a user.

As noted above with reference to exemplary embodiments thereof, the present invention provides for receiving login information that is used to initiate an authentication process, making an authentication based on the received login information, receiving server communicated XML business rules and DTD, modifying a business rule based on input from the authenticated source, and validating the modified business rule. Moreover, the method and system of the present invention provides for the sending of a new XML business rule to a server. The new business rule is created as a declarative object instead of a programming object. Accordingly, the present invention provides a method and system that provides for the definition and distribution of business rules.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for definition and distribution of business rules, said method comprising computer implemented steps of:
   receiving at a user terminal from a server a current set of business rules, the current set of business rules being a programming object, which are written in XML (Extensible Markup Language) with document schema files, wherein the server is remote to the user terminal, and wherein the current set of business rules reflects at least a portion of a valid set of business rules stored on the server when the current set of business rules is received;
   receiving login information at the user terminal to initiate an authentication process of a user;
   authenticating the user based at least in part on the received login information to determine whether the user is an authenticated user, wherein the authenticated user has privileges to modify the current set of business rules but does not have privileges to modify the valid set of business rules;
   modifying, when the user is the authenticated user, the current set of business rules based on received inputs from the authenticated user to obtain a new set of business rules;
   validating the new set of business rules against the valid set of business rules stored on the server; and
   replacing the current set of business rules with the new set of business rules on the server when the new set of business rules is valid,
   wherein the new set of business rules is created as a declarative object instead of a programming object.

2. The method of claim 1, wherein the new set of business rules is validated locally.

3. The method of claim 2, wherein the new set of business rules is validated locally using Document Type Definition (DTD) files.

4. The method of claim 1, wherein the authenticating step determines privileges.

5. The method of claim 1, wherein the business rules are defined in a DTD file.

6. The method of claim 5, wherein business logic is changed by changing a rule in the DTD file.

7. The method of claim 6, wherein a rule consists of a tag, an optional condition set, and an action set.

8. The method of claim 7, wherein the condition set defines conditions that make a rule true.

9. The method of claim 8, wherein the action set defines actions that are performed if all the conditions in the condition set are true.

10. The method of claim 9, wherein a rule is automatically true if it has no condition set.

11. The method of claim 10, wherein the action set is performed if all conditions are true but is ignored otherwise.

12. The method of claim 1, wherein the server is connected to clients via internet.

13. The method of claim 12, wherein the user logs into one of the clients.

14. The method of claim 1, wherein the new set of business rules are validated remotely on the server.

15. A computer usable medium having computer useable code embodied therein for causing a computer to perform operations comprising:
- receiving from a server a current set of business rules, the current set of business rules being a programming object, which are written in XML (Extensible Markup Language) with document schema files, wherein the server is connected to client via internet, and a user logs into one of the clients, and wherein the current set of business rules reflects at least a portion of a valid set of business rules stored on the server when the current set of business rules is received;
- receiving login information for the user to initiate an authentication process;
- authenticating the user based at least in part on the received login information to determine whether the user is an authenticated user, wherein the authenticated user has privileges to modify the current set of business rules but does not have privileges to modify the valid set of business rules;
- modifying, when the user is the authenticated user, the current set of business rules based on received inputs from the authenticated user to obtain a new set of business rules;
- validating the new set of business rules locally on the client or remotely on the server against the valid set of business rules stored on the server; and
- replacing the current set of business rules with the new set of business rules on the server when the new set of business rules is valid,
- wherein the new set of business rules is created as a declarative object instead of a programming object.

16. The medium of claim 15, wherein the authentication process determines privileges.

17. The medium of claim 16, wherein business rules are defined in a DTD file.

18. The medium of claim 17, wherein business logic is changed by changing a rule in the DTD file.

19. The medium of claim 18, wherein a rule consists of a tag, an optional condition set, and an action set.

20. The medium of claim 19, wherein the condition set defines conditions that make a rule true.

21. The medium of claim 20, wherein the action set defines actions that are performed if all the conditions in the condition set are true.

22. The medium of claim 21, wherein a rule is automatically true if it has no condition set.

23. The medium of claim 22, wherein the action set is performed if all conditions are true but is ignored otherwise.

24. A computer system comprising:
- a bus;
- a computer readable memory unit coupled to said bus; and
- a processor coupled to said bus for executing a method for implementing an application comprising:
  - receiving from a server a current set of business rules, the current set of business rules being a programming object, which are written in XML (Extensible Markup Language) with document schema files, wherein the server is connected to client via internet, and a user logs into one of the clients, and wherein the current set of business rules reflects at least a portion of a valid set of business rules stored on the server when the current set of business rules is received;
  - receiving login information for the user to initiate an authentication process;
  - authenticating the user based at least in part on the received login information to determine whether the user is an authenticated user, wherein the authenticated user has privileges to modify the current set of business rules but does not have privileges to modify the valid set of business rules;
  - modifying, when the user is the authenticated user, the current set of business rules based on received inputs from the authenticated user to obtain a new set of business rules;
  - validating the new set of business rules locally on the client or remotely on the server against the valid set of business rules stored on the server; and
  - replacing the current set of business rules with the new set of business rules on the server when the new set of business rules is valid,
  - wherein the new set of business rules is created as a declarative object instead of a programming object.

25. The computer system of claim 24, wherein the authentication process determines privileges.

26. The computer system of claim 25, wherein business rules are defined in a DTD file.

27. The computer system of claim 26, wherein business logic is changed by changing a rule in the DTD file.

28. The computer system of claim 27, wherein a rule consists of a tag, an optional condition set, and an action set.

29. The computer system of claim 28, wherein the condition set defines conditions that make a rule true.

30. The computer system of claim 29, wherein the action set defines actions that are performed if all the conditions in the condition set are true.

31. The computer system of claim 30, wherein a rule is automatically true if it has no condition set.

32. The computer system of claim 31, wherein the action set is performed if all conditions are true but is ignored otherwise.

* * * * *